(12) United States Patent
Nebrigic et al.

(10) Patent No.: US 7,208,928 B2
(45) Date of Patent: Apr. 24, 2007

(54) OSCILLATORLESS DC-DC POWER CONVERTER

(75) Inventors: Dragan Danilo Nebrigic, Carlsbad, CA (US); Milan Marcel Jevtitch, Cincinnati, OH (US); Vladimir Gartstein, Cincinnati, OH (US); William Thomas Mllam, Knoxville, TN (US); James Vig Sherrill, Oak Ridge, TN (US); Nicholas Busko, Oak Ridge, TN (US); Peter Hansen, Knoxville, TN (US)

(73) Assignee: The Board of Trustees of the University of Illinois, Chicago, IL (US)

( * ) Notice: Subject to any disclaimer, the term of this patent is extended or adjusted under 35 U.S.C. 154(b) by 0 days.

(21) Appl. No.: 10/221,424

(22) PCT Filed: Mar. 16, 2001

(86) PCT No.: PCT/US01/08454

§ 371 (c)(1),
(2), (4) Date: Oct. 17, 2003

(87) PCT Pub. No.: WO01/71894

PCT Pub. Date: Sep. 27, 2001

(65) Prior Publication Data

US 2004/0056642 A1 Mar. 25, 2004

Related U.S. Application Data

(60) Provisional application No. 60/191,138, filed on Mar. 22, 2000.

(51) Int. Cl.
*G05F 1/40* (2006.01)
(52) U.S. Cl. .................. 323/285; 323/224; 323/284

(58) Field of Classification Search ........ 323/222–225, 323/268, 271, 282, 284, 285, 299; 363/21.06, 363/21.14, 127
See application file for complete search history.

(56) References Cited

U.S. PATENT DOCUMENTS

| 4,578,631 | A |   | 3/1986  | Smith ...................... 323/282 |
|-----------|---|---|---------|--------------------------------------|
| 4,626,982 | A | * | 12/1986 | Huber ........................ 363/80 |
| 4,672,303 | A | * | 6/1987  | Newton ..................... 323/285 |
| 5,134,355 | A |   | 7/1992  | Hastings ................... 323/211 |
| 5,164,657 | A |   | 11/1992 | Gulczynski ................ 323/275 |
| 5,233,287 | A | * | 8/1993  | Lenk ......................... 323/268 |
| 5,528,480 | A |   | 6/1996  | Kikinis et al. ............... 363/15 |

(Continued)

*Primary Examiner*—Gary L Laxton
(74) *Attorney, Agent, or Firm*—Greer, Burns & Crain, Ltd.

(57) ABSTRACT

A power converter for coupling an energy source to a load device comprising a selectively coupled output stage to deliver energy from an energy source to a load device, a controller coupled to the output stage, an output stage, a capacitive element coupled to the output terminals, a rectifying element, and a switch responsive to a control signal from the controller. The rectifying element and switch are coupled to the inductive and capacitive elements. The controller is responsive to input signals for generating the control signal to open the switch in a first state and close the switch in a second state. The input signals to the controller produce one or more output voltages across the output terminals, an input voltage across the input terminals, a selectable reference voltage and a feedback signal measured with respect to the inductive element.

12 Claims, 11 Drawing Sheets

U.S. PATENT DOCUMENTS

| | | | |
|---|---|---|---|
| 5,751,139 A * | 5/1998 | Jordan et al. | 323/222 |
| 5,770,940 A | 6/1998 | Goder | 323/282 |
| 5,929,615 A * | 7/1999 | D'Angelo et al. | 323/224 |
| 5,959,443 A | 9/1999 | Littlefield | 323/287 |
| 6,194,880 B1 * | 2/2001 | Fraidlin et al. | 323/222 |
| 6,249,156 B1 * | 6/2001 | Attwood | 327/110 |
| 6,483,278 B2 * | 11/2002 | Harvest | 323/224 |
| 6,541,947 B1 * | 4/2003 | Dittmer et al. | 323/224 |

* cited by examiner

OSCILLATORLESS DC-DC POWER CONVERTER

CROSS REFERENCE TO RELATED APPLICATIONS

This application claims the benefit of, and hereby incorporates by reference in its entirety, the commonly owned U.S. Provisional Application Ser. No. 60/141,119, that was filed on 25 Jun. 1999 by Dragan D. Nebrigic, Milan M. Jevtitch, Vig Sherill, Nick Busko, William Millam and Peter Hansen: entitled "BATTERY HAVING BUILT-IN DYNAMICALLY-SWITCHED CAPACITIVE POWER CONVERTER."

This application is also related to the following co-pending and commonly owned application which was filed on even date herewith by Dragan D. Nebrigic, et. al.: U.S. Ser. No. 09/532,918 entitled "DYNAMICALLY-CONTROLLED, INTRINSICALLY REGULATED CHARGE PUMP POWER CONVERTER" (P&G Case No. 7993) and which is hereby incorporated by reference herein in its entirety.

FIELD OF THE INVENTION

The present invention relates to DC/DC power supply controllers, and more particularly to regulated inductive power converters for integrated power management systems.

BACKGROUND OF THE INVENTION

Advances in electronics technology have enabled the design and cost-effective fabrication of portable electronic devices. Thus, usage of portable electronic devices continues to increase as do the number and types of products. Examples of the broad spectrum of portable electronic devices include pagers, cellular telephones, music players, calculators, laptop computers, and personal digital assistants, as well as others.

The electronics in a portable electronic device generally require direct current (DC) electrical power. Typically, one or more batteries are used as an energy source to provide this DC electrical power. Ideally, the energy source would be perfectly matched to the energy requirements of the portable electronic device. However, most often the voltage and current from the batteries are unsuitable for directly powering the electronics of the portable electronic device. For example, the voltage level determined from the batteries may differ from the voltage level required by the device electronically. In addition, some portions of the electronics may operate at a different voltage level than other portions, thereby requiring different energy source voltage levels. Still further, batteries are often unable to respond quickly to rapid fluctuations in current demand by a device.

A typical arrangement is shown in FIG. 1 for a portable electronic device 10 that includes an energy source 12, such as one or more batteries, and a load device 14, such as the internal electronics that require electrical power. Interposed between the energy source 12 and the load device 14 is a power supply 16 that may perform a number of functions. For example, a power converter 20, depicted as integral to the power supply 16, provides the necessary changes to the power from the energy source 12 to make it suitable for the load device 14.

The power supply 16 may also perform functions other than power conversion. For example, protecting the energy source 12, load device 14 and/or power converter 20 from damage by a sustained high electrical current may require electrically disconnecting the energy source 12 from the rest of the portable electronic device 10. As another example, the power converter 20 may require assistance during start-up which is provided by the supply 16.

With respect to the types of power conversion required, the power converter 20 may "step up" (i.e., boost) or "step down" the voltage. That is, the converter 20 may increase or decrease the input voltage $V_S$ from the energy source 12 across a pair of input terminals 24, 25 to an output voltage $V_O$ provided to the load device 14 across a pair of output terminals 26, 27. The power converter 20 may also store an amount of energy to satisfy a brief spike or increase in demand by the load device 14 that the energy source 12 is unable to provide.

The power converter 20 may also regulate the output voltage $V_O$, keeping it close to the desired output voltage level and reducing rapid fluctuations that may cause detrimental noise or cause undesirable performance of the load device 14. Such fluctuations may occur due to changes in demand by the load, induced noise from external electromagnetic sources, characteristics of the energy source 12, and/or noise from other components in the power supply 16.

Inductive DC-DC power converters are often used in medium to medium/high capacity switching power supplies. Known inductive DC-DC power converters are based upon switching an output stage between a charge and discharge state. The output stage includes a switch that, when closed during the charge state, causes an inductive element, such as an inductor to charge (i.e., to store energy in an electric field) from the energy source. A rectifying element, such as a diode, is non-conductive, thereby preventing discharging to a load capacitor across the output terminals. During the discharge state, the switch is opened and the rectifying element conducts allowing the inductor to discharge into the load capacitor.

Known inductive DC-DC power converters are configured in various ways in order to achieve greater capacities, voltage ranges, and inverting/noninverting outputs. An inverted output has the opposite algebraic sign as the input. For example, an input voltage is provided at the positive input terminal 24 at +1.5 V referenced to a grounded negative input terminal 25. The positive output terminal 26 is grounded and the negative output terminal 27 is −1.0 V. Examples of known configurations include converters referred to buck, boost, buck-boost, noninverting buck-boost, bridge, Watkins-Johnson, current fed bridge, uk, single-ended primary inductance converter (SEPIC), buck square.

Inductive DC-DC power converters are often chosen due to power efficiencies which are greater than other converters such as linear converters, whose efficiency is related to the ratio of output voltage $V_O$ to input voltage $V_S$. Also, the output voltage $V_O$ of inductive converters is generally related to the duty cycle of the switching, rather than the operating frequency of the switching, unlike generally known capacitive power converters.

However, known output stages for inductive DC-DC power converters 20 do have some drawbacks related to the capacitor, switch, and rectifying elements used in the converter. Specifically, reliance upon a diode as the rectifying element imposes a voltage drop across the diode that makes low input voltages (e.g., sub-one volt) impractical. In addition, generally known switches similarly require a control signal of a magnitude unsuitable for low input voltages. In addition, the range of practical inductance and capacitance values is constrained by achievable operating frequencies of the controller. Therefore, relatively expensive, noisy, and relatively large discrete inductors are required for the power output stage within an inductive converter.

Furthermore, known inductive DC-DC power converters 20 rely upon oscillator-based control. The inductor-capacitor combination chosen for these known "oscillator-controlled power converters" 20 generally dictate an operating frequency suitable for operation. Adjustments to the power delivered by the oscillator-controlled power converter is often provided by Pulse Width Modulation (PWM) or Pulse Frequency Modulation (PFM) by a controller. The problems with PWM and PFM schemes include circuit and fabrication complexity. Such complexity results in difficulty in miniaturizing the power converter 20 due to the number of discrete components necessary and/or the required area allocated on a semiconductor device.

In addition to the drawbacks associated with their complexity, oscillator-controlled power converters are also inefficient with light loads due to the continued operation of the oscillator.

Still further drawbacks in the prior art are the result of some inductive DC-DC power converters 20 using feedback, either inductor voltage $V_L$ or inductor current $i_L$, feedback to sense the energy stored in the inductor as well as to sense the output voltage $V_O$. These feedback techniques cause problems due to the nature of PWM and PFM control. For instance, inductor voltage $V_L$ feedback is an indirect approach to sensing the stored energy in the inductor L and introduces noise into the feedback voltage $V_F$, (which is the same as or directly related to the inductor voltage $V_L$,) due to fluctuations in input voltage $V_S$ and/or demand by the load device 14. Using current feedback avoids sources of voltage noise; however, known current-feedback power converters 20 suffer problems with respect to inadequate robustness to noise disturbances in the current feedback $i_F$, (which is the same as or directly related to the inductor current $i_L$,) resulting in premature switching and reduced power converter stability.

SUMMARY OF THE INVENTION

The invention overcomes the above-noted and other deficiencies of the prior art by providing an apparatus and method for a dynamically controlled inductive DC/DC power converter that efficiently transfers power from an energy source as demanded by a load device.

In particular, in one aspect consistent with the invention, a dynamic controller operates an inductive power output stage to transfer energy at a rate to maintain an output voltage $V_O$ across a load capacitor $C_L$. More particularly, a power converter has a power output stage that is operable to electrically couple to input terminals of an energy source input terminals and to output terminals of a load device. The power output stage includes an inductive element that is charged by an inductor current supplied by the energy source during a charge state. The power output stage also includes the load capacitor that is charged by the inductive element during a discharge state. The dynamic controller is responsive to input signals for selectively and non-oscillatorily generating the control signal S2 to open the switch in a discharge state and close the switch in the charge state. The input signals to the controller including one or more of an output voltage across the output terminals, an input voltage across the input terminals, a selectable reference voltage and a feedback voltage measured across the inductive element.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF INVENTION

Figure 1:
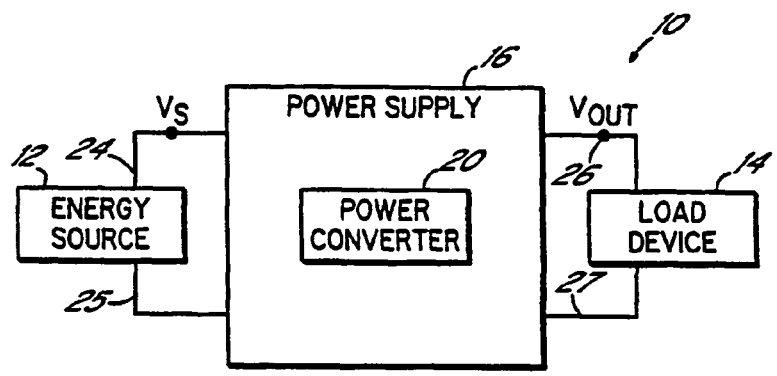
FIG. 1 is a top-level block diagram of a portable electronic device incorporating a power supply with a power converter.
Figure 2A:
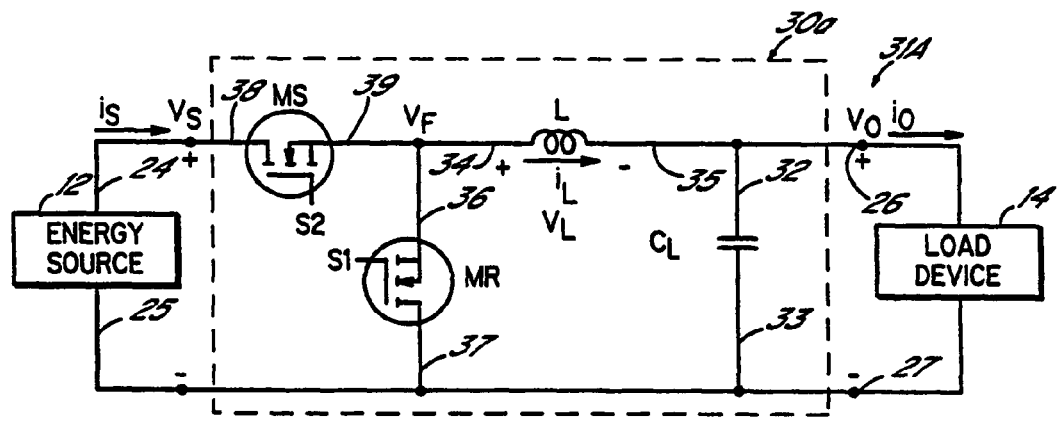
FIG. 2A is a top-level diagram of an output stage for a buck power converter.

An explanation of known inductive power converters will be helpful in understanding the invention. Referring to FIG. 2A, a top-level diagram of a known buck power output stage 30a for a power converter 31A is depicted, as an example of a down converter that provides an output voltage $V_O$ that is less than the input voltage $V_S$. The buck output stage 30a is coupled to an energy source 12 at input terminals 24, 25 and to a load device 14 at output terminals 26, 27 to deliver energy from the energy source to the load device. The energy source 12 provides an input voltage $V_S$ and an input current $i_S$. The load device 14 receives a current $i_O$ and an output voltage $V_O$.

The buck output stage 30a includes a switch MS, a rectifying element MR, an inductive element, such as an inductor L, and a capacitance element, such as a load capacitor $C_L$. The load capacitor $C_L$ has its positive terminal 32 coupled to the positive output terminal 26 and its negative terminal 33 coupled the negative output terminal 27, which is also coupled to the negative input terminal 25 forming a ground reference. The load capacitor $C_L$, thus, is charged to the output voltage $V_O$. The inductor L has its positive end 34 coupled to a feedback voltage node $V_F$. The feedback voltage $V_F$ is related to the voltage $V_L$ across the inductor L. The inductor L has its negative end 35 coupled to the positive output terminal 26.

The rectifying element MR, implemented as a MOSFET configured as a synchronous rectifier, has its positive terminal (source) 36 coupled to the feedback voltage node $V_F$ and its negative terminal (drain) 37 coupled the negative input and output terminals, 25, 27. The rectifying element MR closes in response to a control signal S1 in order to act like a diode. The MOSFET of the rectifying element MR has a channel that conducts current in the reverse direction, and thereby acts like a diode often used in oscillator-controlled power converters 20, by having the source and drain reversed compared to the MOSFET switch MS. The switch MS has its positive end (drain) 38 coupled to the positive input terminal 24 and its negative end (source) 39 coupled to the feedback voltage node $V_F$. The switch MS closes in response to control signal S2 turning ON.

During the discharge state, the control signal S1 is ON to close the rectifying element MR so that it conducts and the control signal S2 is OFF to open the switch MS, allowing the inductor L to discharge into the load capacitor $C_L$. During the charge state, the control signal S1 is OFF to open the rectifying element or make it non-conductive MR and the control signal S2 is ON to close the switch MS, allowing the inductor to be energized by the input current is from the energy source 12.

Figure 2B:
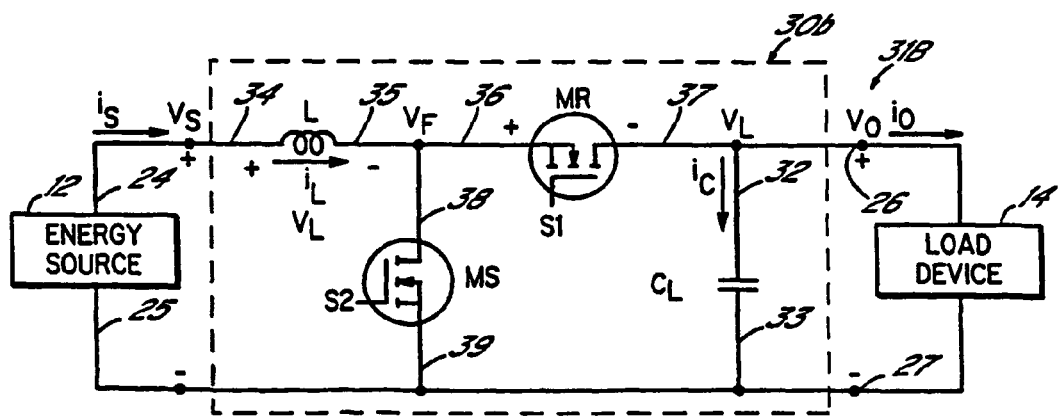
FIG. 2B is a top-level diagram of an output stage for a boost power converter.

Referring to FIG. 2B, a boost power output stage 30b for a power converter 31 illustrates a configuration suitable for increasing the output voltage $V_O$ with respect to the input voltage $V_S$. The boost power output stage 30b has its input terminals 24, 25, output terminals 26, 27, and load capacitor $C_L$ configured as described above for the buck power output stage 30a. The inductor voltage $V_L$ is defined between the input terminal 24 and the feedback voltage node $V_F$. This inductor voltage $V_L$ is thus equivalent to the feedback voltage $V_L$ minus the input voltage $V_S$.

Rectifying element MR has its negative end 37 coupled to $V_L$? the feedback voltage node $V_F$ and its positive end 36 coupled to the positive output terminal 26. Specifically, a MOSFET is configured as a synchronous rectifier with its drain as the negative end and its source as the positive end. MOSFET switch MS has its positive end (drain) coupled to the feedback voltage node $V_F$ and its negative end (source) coupled to ground. During the discharge state, the MOSFET switch MS opens in response to control signal S2 turning OFF and rectifying element MR closes in response to control signal S1 turning ON, coupling the energy source 12 and inductor L to the load capacitor $C_L$. Thus, the input voltage $V_L$ and inductor voltage $V_L$ are added in order to boost the output voltage $V_O$ imparted to the load capacitor $C_L$. During the charge state, MOSFET switch MS closes in response to control signal S2 turning ON, coupling the inductor L across the energy source 12. Rectifying element MR opens in response to control signal S1 turning OFF, disconnecting the load capacitor $C_L$ from the energy source 12 and inductor L.

In accordance with one aspect of the present invention, the buck power output stage 30a of FIG. 2A and the boost power output stage 30b of FIG. 2B are both advantageously efficient and operable with a low input voltage (e.g., sub-one volt) by implementation as an integrated circuit fabricated in a 0.35 micron double salicide process (two metal, two poly salicide) utilizing MOSFET transistor switches capable of low threshold (e.g., sub-one volt) control, as described the following co-pending and commonly owned applications all filed on Mar. 22, 2000: U.S. Ser. No. 09/532,761, entitled "Lateral Asymmetric Lightly Doped Drain MOSFET", naming Ying Xu et al. (P&G Case No.7992), which is hereby incorporated by reference. In addition to having a low threshold control, the disclosed MOSFET devices have a low on-resistance, directly contributing to the efficiency of the power output stage 30a and 30b used in accordance with the invention.

Figure 3:
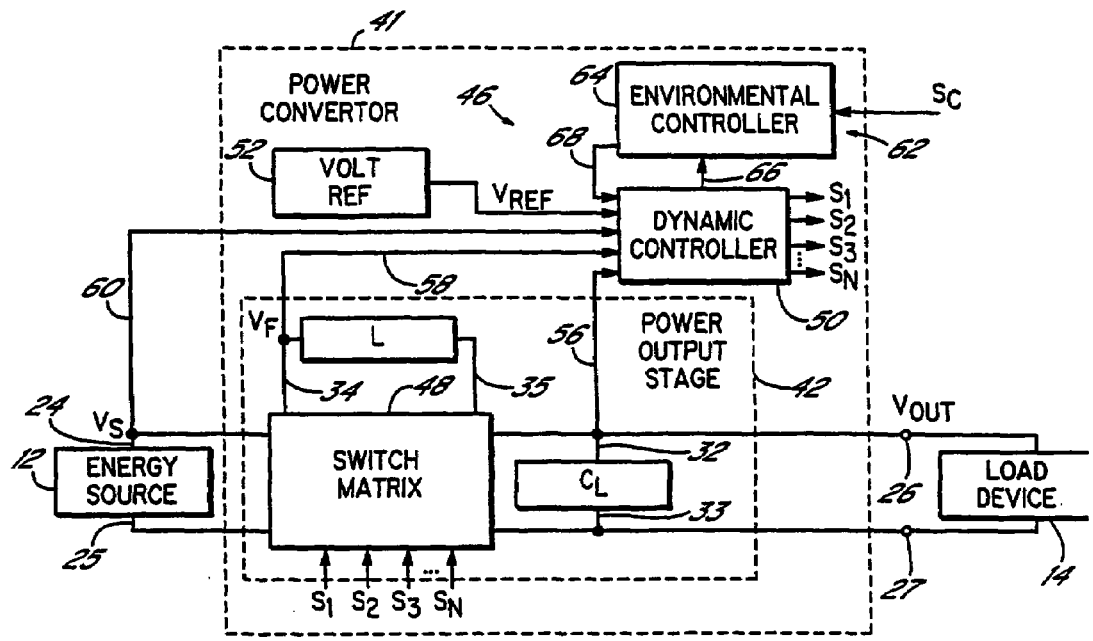
FIG. 3 is a top-level block diagram of a dynamically controlled inductive power converter in accordance with the invention.

Referring to FIG. 3, a power converter 41 is depicted in block diagram form, illustrating oscillatorless, dynamic control of power transfer from an energy source 12 to a load device 14 coupled to the output voltage $V_O$ across output terminals 26, 27 in accordance with one aspect of the invention. The power converter 41 is dynamically controlled in that it adapts to the demands from the load device 14, even with variations in the input voltage $V_S$, and variation in the transfer and storage characteristics of the power converter 41.

The power converter 41 is intrinsically voltage regulated in that the amount of energy transferred does not only correspond to the demand, but the rate of energy transfer is controlled so that the output voltage $V_O$ remains within an accepted range. This is generally referred to as remaining within an acceptable voltage ripple $V_{RIP}$.

The power converter 41 includes a power output stage 42 that transfers the stored energy to the load device 14 and a power controller 46 coupled to the power output stage 30 to responsively command the appropriate amount of stored energy to be transferred in accordance with the present invention.

In one embodiment, the power output stage 42 is an inductive DC-DC power converter, of which the above described buck power output stage 30a and boost power output stage 30b are examples. The load capacitor $C_L$ is electrically coupled across the output terminals 26, 27. The load capacitor $C_L$ stores electrical charge and provides the output voltage $V_O$ in relation to its stored charge. The power output stage 42 also incorporates the inductor L for transferring energy from the energy source 12 to the load capacitor $C_L$ as discussed above. The series resistance for the inductor L and the load capacitor $C_L$ may advantageously be chosen to be low so that the power converter 41 has reduced power consumption. The power output stage 42 includes a switch matrix 48 coupled to the inductor L, load capacitor $C_L$, and energy source 12 for configuring the power output stage 30 between a charge state and a discharge state.

In addition, the power output stage 30 may be inverting or noninverting, with respect to whether the output voltage has an opposite algebraic sign to the input voltage $V_S$. For example, a 2.2 V input voltage $V_S$ may be converted to a −1.6 V output voltage $V_O$. Generally, noninverting embodiments are illustrated below for clarity, although one skilled in the art, having the benefit of the instant disclosure, should recognize application to inverting power converters.

Multi-loop power controller 46 comprises a dynamic controller 50, a voltage reference 52, and an environmental controller 64 to advantageously control the power output stage 42. The dynamic controller is responsive to feedback signals which act as input signals to the controller 50. A first control loop 56 is formed by the output voltage $V_O$ from output terminal 26 being provided as feedback to the dynamic controller 50. The dynamic controller 50 commands the switch matrix 48 to transfer additional charge from the energy source 12 to the load capacitor $C_L$ in response to the output voltage $V_O$ being below a predetermined value $V_{REF}$. The dynamic controller 50 makes the determination of whether $V_O$ is below a predetermined value in comparison to a reference voltage $V_{REF}$ from voltage reference 52. One suitable $V_{REF}$ may be provided by the energy source 12 if it is sufficiently voltage stable to simplify the voltage reference 52 (e.g., lithium batteries are voltage stable). Thus, the voltage reference 52 may then be provided by a voltage divider or multiplier of the input voltage $V_S$ to achieve the desired reference voltage $V_{REF}$.

In addition to the first control loop 56, the multi-loop power controller 46 is responsive to a second control loop 58 or input signal. In the second control loop 58, the energy stored in the inductor L is sensed indirectly by the dynamic controller 50 as a feedback voltage $V_F$, which is the same as or directly related to the inductor voltage $V_L$. Alternatively, the energy stored in the inductor L may be directly sensed as the strength of an electrical field created by inductor current $i_L$, or by a feedback current $i_F$, which may be the same as or directly related to the inductor current $i_L$, as will be discussed with regard to FIG. 15 below. Thus, using the feedback signal associated with the inductor, any discharge of the inductor L upon demand may be predicated upon the inductor L first reaching an optimum state of charge (i.e., energy stored in the form of an electrical field). The optimum state of charge exists because undercharging the inductor L results in unnecessary switching power losses and overcharging the inductor L unnecessarily limits the rate of power transfer.

Regarding unnecessary switch power losses, dynamic control of the switch matrix 48 achieves efficiency in part as described with the first control loop by remaining in the discharge state until more charge is needed (i.e., until $V_O$ drops below $V_{REF}$). Prior art oscillator-controlled power converters 20, by contrast, are switched at a fixed rate even when not necessary. Therefore, the present invention is oscillatorless and provides control non-oscillatorily even though it will switch periodically, because the switching is determined by feedback control and does not continuously oscillate at a fixed frequency.

Additional efficiency in the dynamic control of the switch matrix 48 is realized by remaining in the charge state long enough for the inductor L to acquire a significant amount of charge. For example, charging to 40% rather than 80% of full charge would require that the operating frequency would double to transfer the same power. The switch MS and rectifying element MR dissipate power in relation to this increased operating frequency. This is due to low-on resistance and high-off resistance of the Field Effect Transistors used. Since power consumption is a function of the square of the current times the resistance, most of the power loss occurs during the transition. Consequently, the second control loop 58 senses the voltage level across the inductor L to avoid undercharging during the charge state, and thus avoid unnecessary switching losses.

Optimizing the charge on the inductor L in accordance with one aspect of the invention also includes avoiding overcharging. Inductors are characterized by their rate of charging as a function of time. Specifically, as inductors approach a filly energized condition, their rate for accepting additional energy decreases. Thus, the initial amount of energy acquired by the inductor takes less time than a later similar amount of energy. For example, it would take less time to energize the inductor L twice to 45% than to energize the inductor L once to 90%, even though the same amount of energy would be accepted by the inductor L. Consequently, leaving the switch matrix 48 in the charge state for a period of time longer than required to achieve the optimum level of charge of the inductor L misses an opportunity to transfer more power.

It should be appreciated that the optimum level of stored energy for a particular inductive component may be determined empirically and/or analytically as would be apparent to those skilled in the art having the benefit of the instant disclosure.

In combination with one or more other control loops 56, 58 discussed above, the power converter 41 may advantageously include a forward control loop 60 as an input signal whereby one or more parameters of the energy source 12 are provided to the dynamic controller 50. One use of the forward control loop 60 would include disabling (i.e., interrupting output current to the output terminals 26, 27) and/or bypassing (i.e., directly coupling the energy source 12 to the output terminals 26, 27) the power converter 31 due to unsafe conditions or performance limiting conditions sensed in the energy source 12. For example, a low input voltage may indicate inadequate remaining charge in the energy source 12 to warrant continued operation of the power converter 31. As another example, the electrical current drawn from the energy source 12 may be too high for sustained operation. Thus, a protection circuit may be included in the power converter 41 for interrupting output current to the output terminals 26, 27 based upon control loop 60.

As yet an additional example of dynamic control, a large demand by the load device 14 may warrant continued operation of the power converter 41 in parallel to a direct coupling of the energy source 12 to the output terminals 26, 27. This may be especially true when the input voltage $V_S$ and desired output voltage $V_O$ are approximately the same. An increased output current capacity is achievable by having two paths providing current to output terminals 26, 27.

As a further example, the feedback voltage $V_F$ (second control loop 58), and the input voltage $V_S$ (forward control loop 60) may indicate that the power converter 41 is fully discharged and is in a start-up condition. This start-up condition may advantageously warrant use of a rapid progressive start-up circuit, an example being described below in accordance with one aspect of the invention.

In combination with one of the other control loops or control input signals 56, 58, and 60, the power controller 46 may further include an adaptive control loop 62, as represented by an environmental controller 64. The environmental controller 64 senses a control parameter 66 and provides a command 68 to the dynamic controller 50 for altering the predetermined value for the output voltage $V_O$. For example, the environmental controller 64 may sense that the dynamic controller 50 has become unstable, and in response thereto, may provide a signal to drive the dynamic controller 50 to a stable output condition. More particularly, the environmental controller 64 may be adapted to sense an unstable operating condition of the power converter 41, such as the instantaneous output voltage and current each approaching a constant value. The environmental controller 64 may then adjust the predetermined value to drive the power converter 41 to a stable operating condition. Moreover, such altering of the predetermined value may include resetting of the dynamic controller 50 to a stable initial condition.

As another example, the adaptive control loop 62 may include a control signal $S_C$ that is input to the environmental controller 64 whereby the dynamic controller 50 can be made to respond to changes in a load device 14 (e.g., CPU, volatile memory, analog-to-digital converter, digital-to-analog converter) or to other parameters. The load device 14 may advantageously perform better with an adjusted output voltage $V_O$ from the power converter 41. As another example, the output control signal $S_C$ may be a reconfiguration control signal, such as for selecting a desired inverting or noninverting mode or predetermined output voltage $V_O$. As yet another example, a protective function (e.g., bypassing, disabling, or altering the output voltages) may be dictated by the $S_C$ command to preclude damaging a load device 14. For example, the load device 14 may fail under high current, and thus, limits may be imposed to preclude this occurrence.

Depending upon the type of switch matrix 48 that is utilized in the invention, various control signals are generated by the dynamic controller 50 for the switch matrix 48, as represented by switch signals S1, S2, S3 to SN. For example, control signals S3 to SN may represent inputs for a configuring the power output stage 42 to various combination in order to provide a step up, step down, inverted, and/or noninverted output arrangement.

It should be appreciated that the inductor L and the load capacitor $C_L$ are illustrative of charge storage and transfer components and may represent discrete elements or integrated circuit elements.

Moreover, due to the flexibility of the dynamic controller 50, the load capacitor $C_L$ may include various levels of storage capability, such as with small capacitors (e.g., ceramic, chip thick film, tantalum, polymer) and large capacitors (e.g., ultra-capacitors, pseudo-capacitors, double-layer capacitors). The amount of inductance and capacitance is reflective of the amount of storage capability. Thus, providing the same amount of energy transfer requires either that small doses of energy be transferred from a small inductor L with a high operating frequency or that larger doses of charge be transferred more slowly. Thus, the power converter 41 is flexible in that the same dynamic controller 50 may control various power output stages 42. In particular, unlike the prior art oscillator-controlled power converter 20, the dynamic controller 50 may operate in the low operating frequency range appropriate for power output stages 30 incorporating ultra-capacitors.

It should further be appreciated that the energy source 12 may include various electrical charge storage or generating devices such as one or more electrochemical cells (e.g., a battery), photovoltaic cells, a direct-current (DC) generator (e.g., a wrist watch charged by a motion-powered generator in combination with a rechargeable battery), and other applicable power sources.

As another example, power converters 41 consistent with the invention may be used advantageously in electronic devices powered by other power supplies. For example, a device receiving its power from a standard alternating current (AC) wall plug generally transforms the AC power into direct current (DC) power for electronic portions of the device. The DC power provided may be unsuitable for all or portions of the electronics without further adjustment and regulation. For example, a microprocessor may be operating at 2.2 V whereas input/output electronics may operate at 5 V. Consequently, a power converter 41 in accordance with the invention may be used to step-down the input voltage to the microprocessor.

Figure 4:
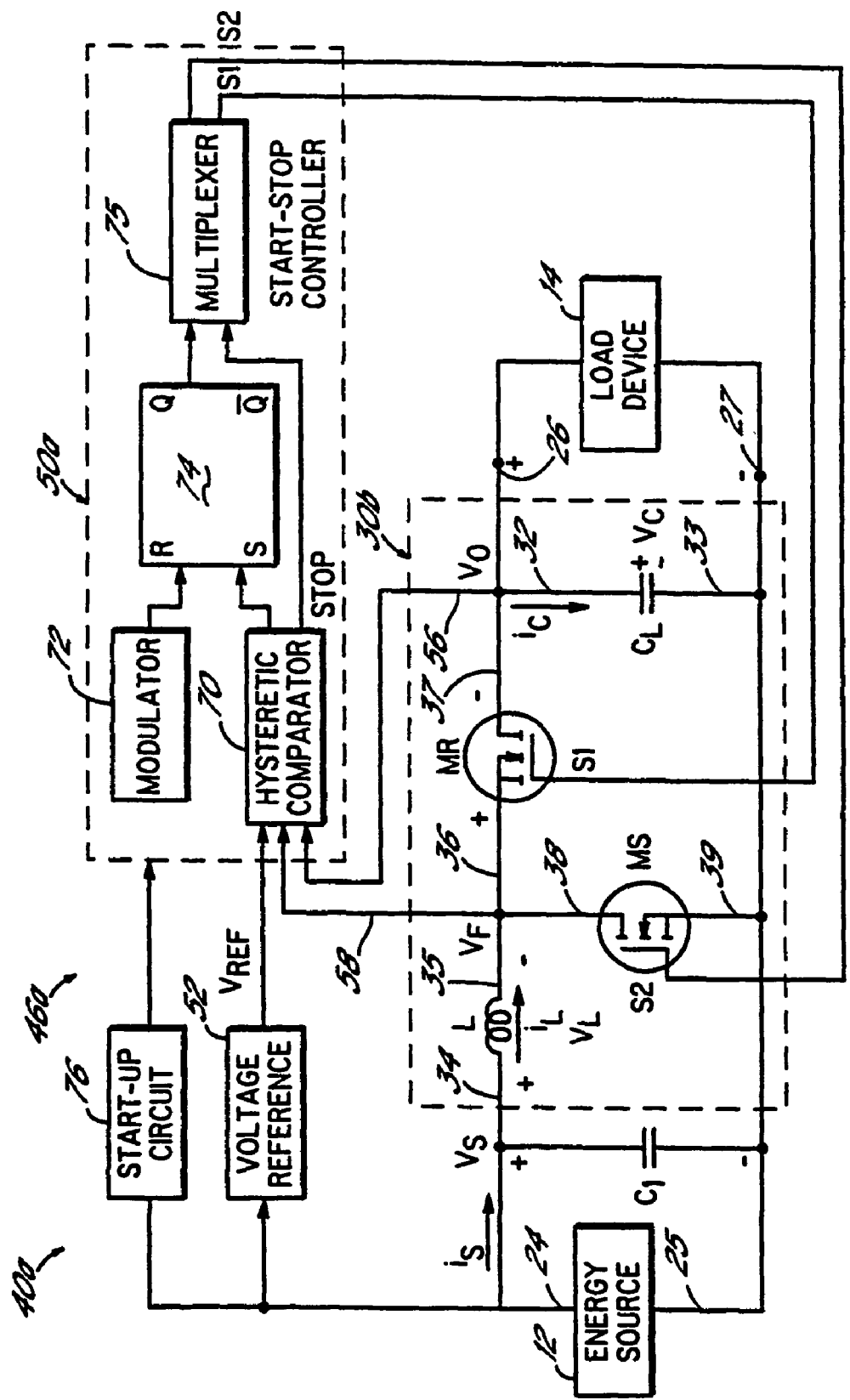
FIG. 4 is one embodiment of a circuit for a start-stop controller for the boost power converter of FIG. 2B in accordance with the invention.

Referring to FIG. 4, one embodiment of a circuit for a start-stop controller 50a for the power output stage 30b of FIG. 2B is illustrated. Generally known power converters 20, including inductive power converters, continue to oscillate, even when the demand from the load device 14 makes the power converter inefficient. Consequently, the start-stop controller advantageously stops the oscillation of a Pulse Width Modulation (PWM) output when the load capacitor $C_L$ is adequately charged.

Specifically, the boost power output stage 30b is as described above in FIG. 2B, except for the addition of a capacitive element C1 coupled across input terminals 24, 25 which is used to enhance the stability of input voltage $V_S$.

The start-stop controller 50a is responsive to input signals for pulse width modulation (PWM), and oscillated control of the power output stage 30b by selectively generating the control signal S1 to close the rectifying element MR during the discharge state and to open the rectifying element MR during the charge state, and selectively generating the control signal S2 to open the switch MS during the discharge state and to close the switch MS during the charge state. The start-stop controller 50a senses a low demand as indicated by the comparison of the reference voltage $V_{REF}$ and the output voltage $V_O$ to hysteretically stop the oscillated control signal so that the output stage 30b remains in the discharge state. The start-stop controller 50a includes a hysteretic comparator 70 responsive to the reference voltage $V_{REF}$, the output voltage $V_O$ and the feedback voltage $V_F$ to generate a duty-cycle signal, and hysteretically responsive to the output voltage $V_O$ and the reference voltage $V_{REF}$ to generate a stop signal. A modulator 72 generates an oscillation signal having the predetermined frequency. An SR flip flop 74 is set by the set duty-cycle signal and reset by the oscillation signal to produce a switching signal which determines the charge state and the discharge state. A multiplexer 75 is responsive to the switching signal to generate the control signals S1 and S2. The multiplexer 75 has a predetermined state switching delay to mitigate cross conduction of the power output stage 30b. The multiplexer 75 is also responsive to the stop signal to stop oscillations until more energy is needed by turning OFF control signal S2 to open switch MS and by turning ON control signal S1 to close rectifying element MR.

In addition, a start-up circuit 76 biases the start-stop controller 50a when the power output stage 30b is discharged, as well as providing initial charge to the load capacitor $C_L$.

Figure 5:
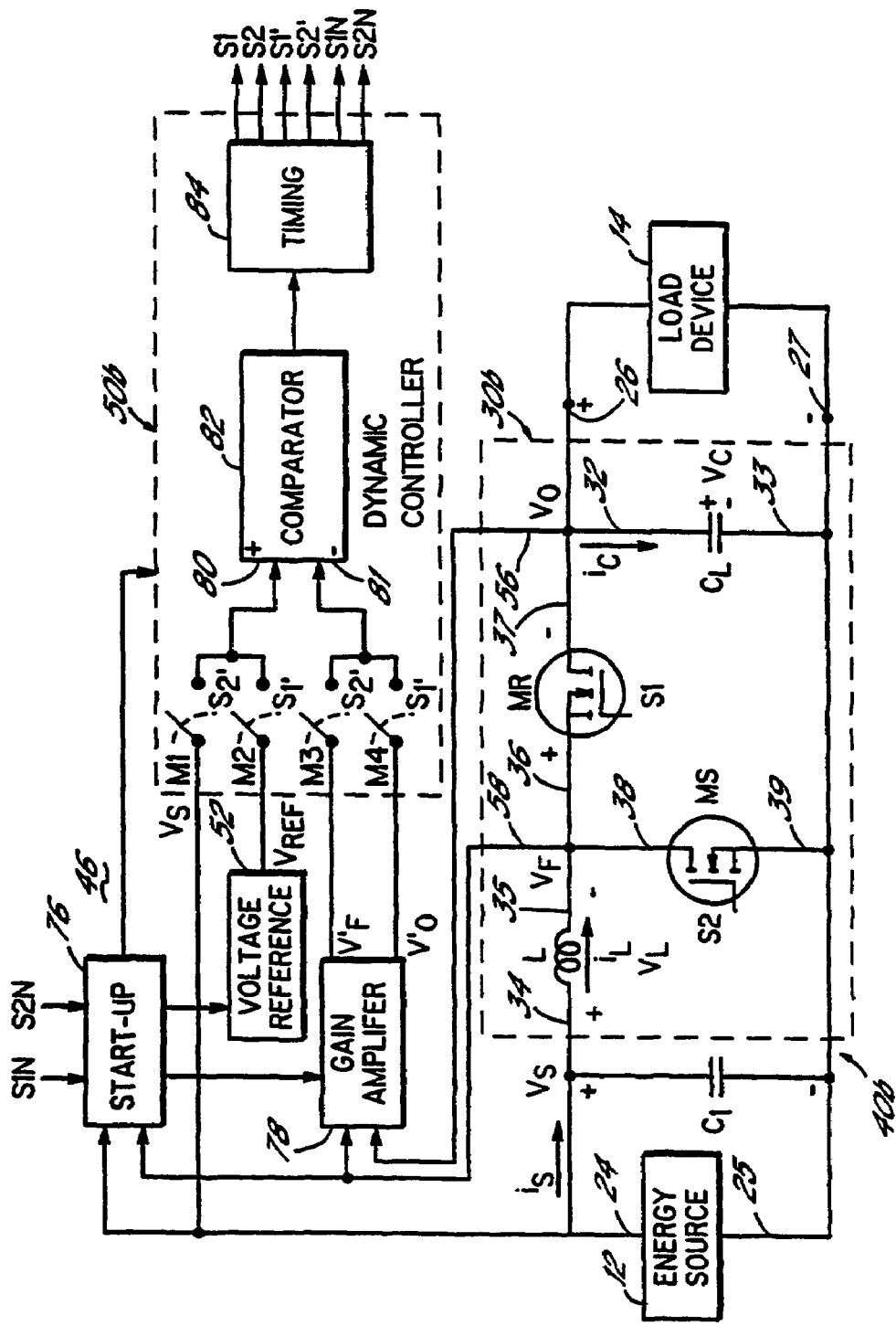
FIG. 5 is an embodiment of a circuit for a voltage-feedback oscillator-less controller for the boost power converter of FIG. 2B in accordance with the invention.

Referring to FIG. 5, an embodiment of a circuit for a voltage-feedback dynamic controller 50b is shown as used for a boost power converter such as shown in FIG. 2B. In particular, the first control loop 56 provides the output voltage $V_O$ and the second control loop 58 provides the feedback voltage $V_F$ to the dynamic controller 50b, which provides control of the charge/discharge states of the converter with control signals S1 and S2.

The start-up circuit 76 is powered by the input voltage $V_S$ from the input terminal 24. The start-up circuit 76 responds to the feedback voltage $V_F$ such that when the power output stage 30b is fully discharged and thus the controller 50b is not yet operating, the start-up circuit 76 provides a bias to the voltage reference 52, to a gain amplifier 78 and to the dynamic controller 50b.

The gain amplifier 78 receives the output voltage $V_O$ and the feedback voltage $V_F$ respectively from the first and second control loops 56, 58, and provides a desired bias and gain to each to produce a filtered and amplified output voltage V'$_O$ and feedback voltage V'$_F$. The desired bias and gain may be selected for appropriate responsiveness and stability of the dynamic controller 50b.

The dynamic controller 50b receives as input signals the input voltage V$_S$, the reference voltage V$_{REF}$ from the voltage reference 52, the filtered feedback voltage V'$_F$, and the filtered output voltage V'$_O$. More particularly, during the discharge state, the dynamic controller 50b couples the reference voltage V$_{REF}$ to a positive comparator input 80 via a switch M2 responsive to a control signal S1'. The dynamic controller 50b couples the filtered output voltage V'$_O$ to a negative comparator input 81 via a switch M4 responsive to the control signal S1'. During the charge state, the dynamic controller 50b couples the input voltage input voltage V$_S$ to the positive comparator input 80 via a switch M1 responsive to a control signal S2'. The dynamic controller 50b further couples the filtered feedback voltage V'$_F$ to the negative comparator input 81 via a switch M3 responsive to the control signal S2'.

The dynamic controller includes a comparator 82 for generating a comparison signal based on the input to the positive and negative comparator inputs 80, 81, as described in FIG. 6 below. The comparison signal is used by a timing circuit 84 to produce the control signals S1, S2, S1', S2', S1N and S2N, as described below in FIG. 14. Control signal S1 is used to control the rectifying element MR, and has sufficient current to control a power MOSFET. Control signal S2 is used to control the switch MS, and has sufficient current to control a power MOSFET. S1' and S2' are unamplified versions of control signals S1, S2, used within the dynamic controller 50b. Control signals S1N and S2N are inverted versions respectively of control signals S1, S2, used for controlling the start-up circuit 76.

Figure 6:
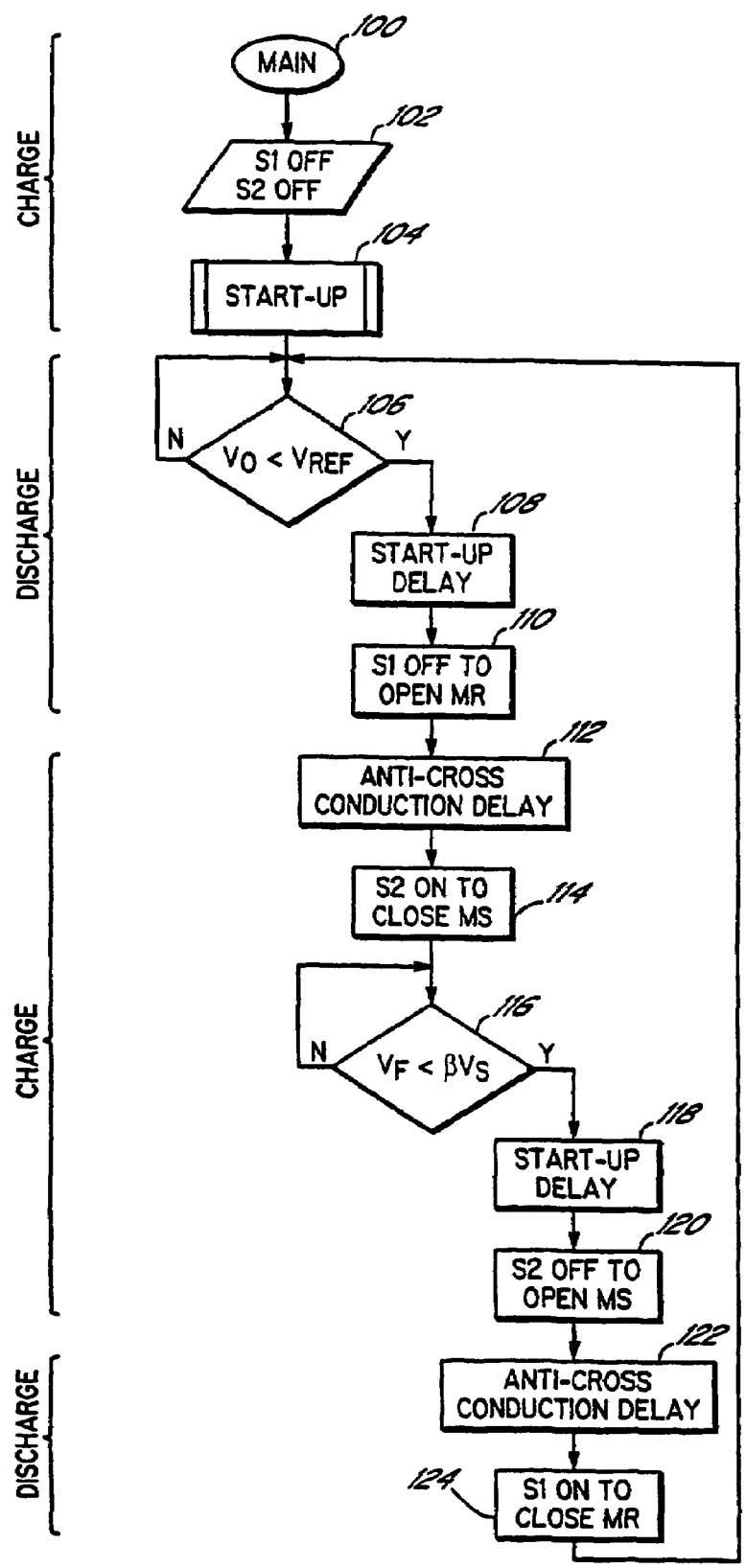
FIG. 6 is a flow diagram for the operation of the voltage-feedback oscillator-less controller of FIG. 5 in accordance with the invention.

Referring to FIG. 6, a flow diagram for an operation 100 of the voltage-feedback dynamic controller 50b of FIG. 5 is shown. The operation 100 begins with the controller not operating, and thus control signals S1 and S2 are OFF (block 102). Thus a start-up operation 104 is performed, as described below in more detail with respect to FIGS. 7–9. Then operation 100 begins dynamic operation, alternating as required between charge and discharge states.

Then, a determination is made as to whether the output voltage V$_O$ is less than the reference voltage V$_{REF}$ (block 106). If not, then the load capacitor C$_L$ is sufficiently charged and operation 100 repeats block 106, remaining in the discharge state.

However, if in block 106 the output voltage V$_O$ is less than the reference voltage V$_{REF}$, then a start-up delay is performed (block 108). Then, control signal S1 is turned OFF, opening rectifying element MR (block 110). A cross conduction delay occurs thereafter with control signal S2 already OFF and switch MS is open (block 112). This prevents inefficient shorting of the power output stage 30b. Then, control signal S2 is turned ON, closing the switch MS, beginning the charge state (block 114).

At block 116, a determination is made as to whether the inductor L is sufficiently energized by determining whether the feedback voltage V$_F$ is greater than or equal to a predetermined fraction β of the input voltage V$_S$, where 0<β<1, with block 116 repeating until satisfied.

The fraction β is chosen either analytically or empirically for providing an optimum energy transfer amount. A relatively small fraction β results in a higher operating frequency of switching. Since typical switches dissipate energy mostly during the transition from OFF to ON and from ON to OFF, minimizing switching increases efficiency. However, a relatively high fraction β limits the capacity of the power output stage 30b since the inductor L has a diminishing rate of energy storage as it approaches a fully energized state.

When block 116 is satisfied, then a start-up delay is performed (block 118). Then, the control signal S2 is turned OFF, opening the switch MS (block 120). A cross conduction delay occurs thereafter with control signal S2 already OFF and switch MS now open (block 122). Then control signal S1 is turned ON, closing the rectifying element MR, beginning the discharge state. Operation 100, thus returns to block 106 to repeat the sequence.

Figure 7:
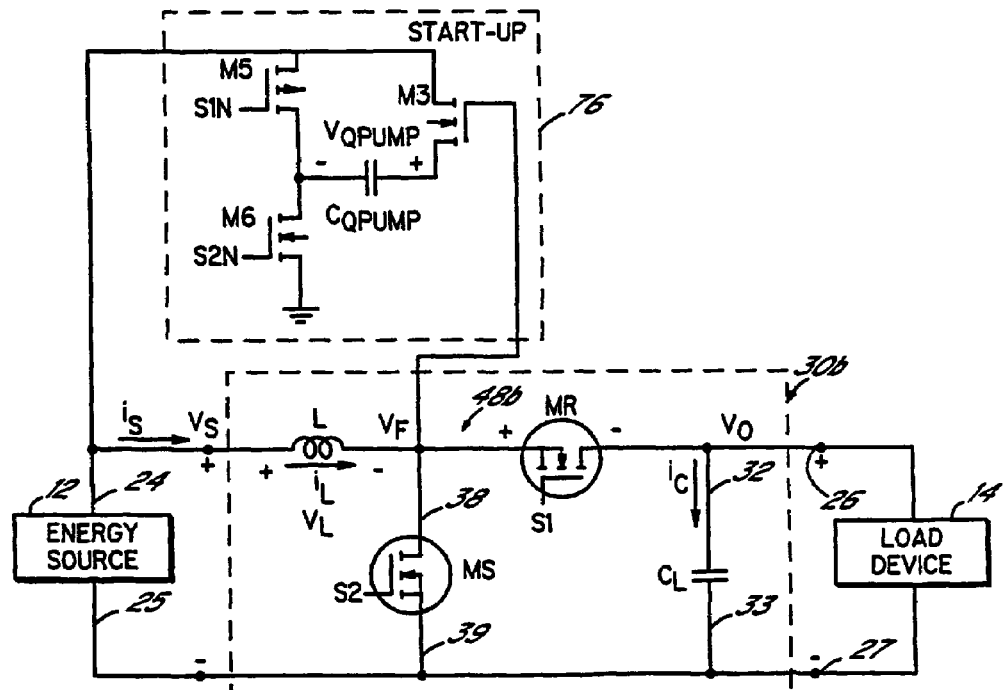
FIG. 7 is an embodiment of a start-up circuit for the boost power converter of FIG. 5 in accordance with the invention.

FIG. 7 is an embodiment of a start-up circuit 76 for the boost power converter of FIG. 5.

Figure 8:
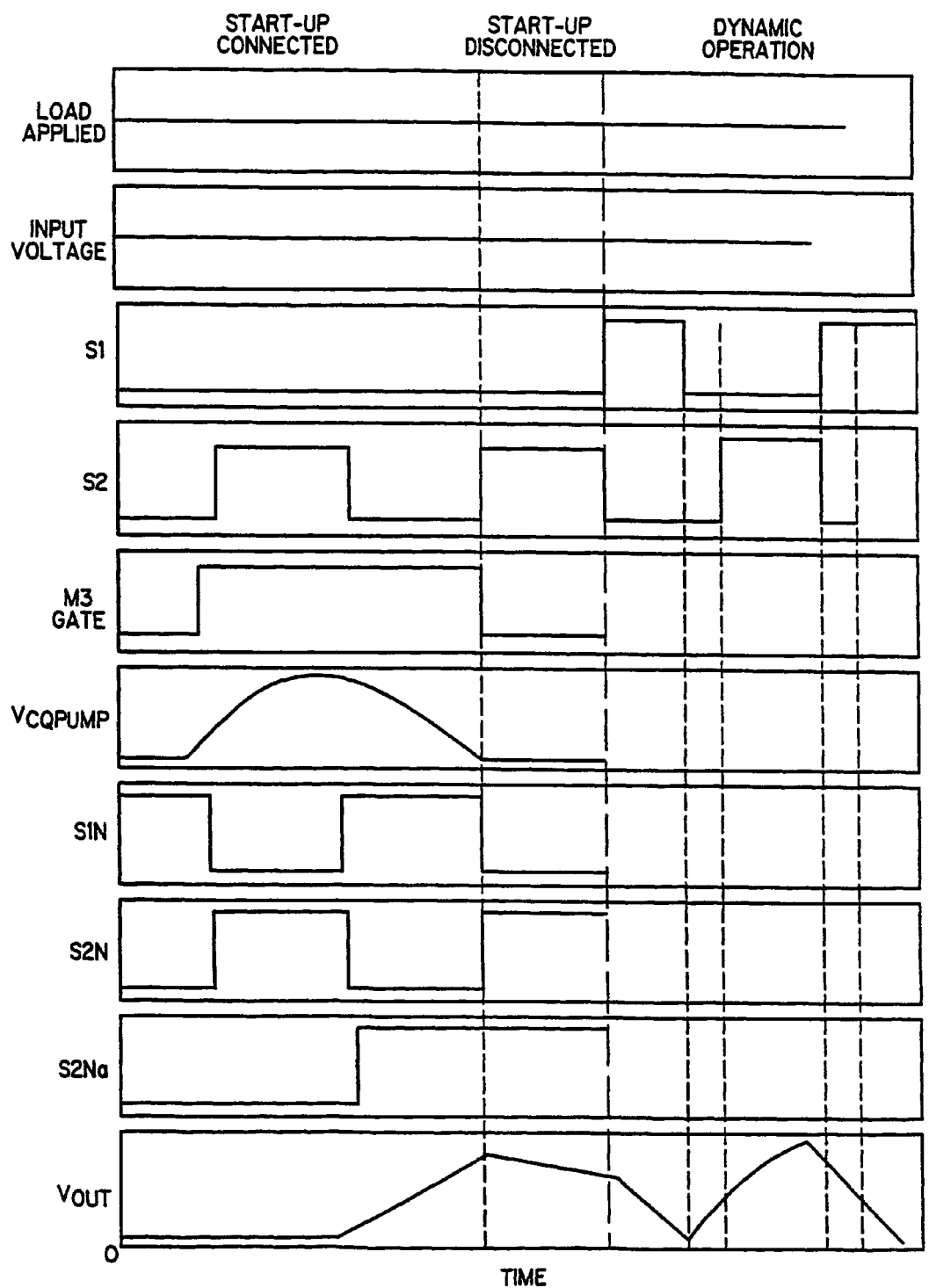
FIG. 8 is a wave diagram for the start-up circuit of FIG. 7.

FIG. 8 is a wave diagram for the start-up circuit 76 of FIG. 7.

Figure 9:
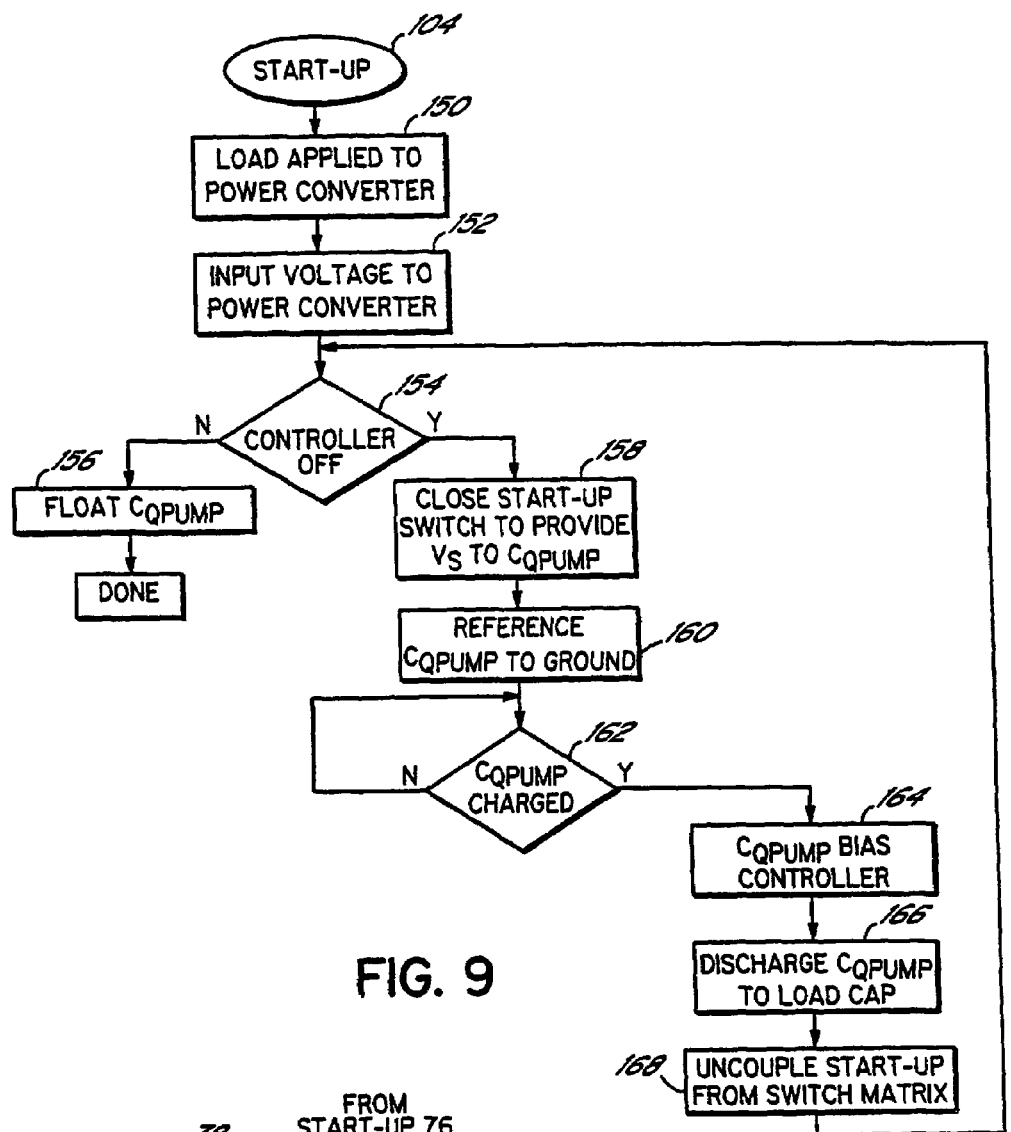
FIG. 9 is a flow diagram for the operation of the start-up circuit of FIG. 7.

Referring to FIG. 9, the operation 104 of the start-up circuit 76 of FIG. 7 is illustrated. The start-up operation 104 begins with an initial condition in block 150 that a load is already applied to the power converter and in block 152 that an input voltage is available to the power converter. Then a determination is made as to whether the power controller is off and not controlling the power output stage (block 154). If the power controller is on (block 154), then a small start-up capacitor C$_{QPUMP}$ is floated (block 156) and the start-up operation 104 is complete.

It should be appreciated that the controller 50b is off with respect to the start-up operation 104 even after the controller begins to operate. That is, control signals to the start-up circuit 76 generally becomes available before the controller actually has developed a sufficient voltage to operate the rectifying element MR and the switch MS.

If in block 154 the controller is off, then a start-up switch is closed to provide input voltage V$_S$ to the start-up capacitor C$_{QPUMP}$ (block 158) and the start-up capacitor C$_{QPUMP}$ is referenced to ground (block 160). When the start-up capacitor C$_{QPUMP}$ is charged (block 162), it is first used to bias the controller (block 164), and then discharged into the load capacitor (block 166) and the start-up circuit including start-up capacitor C$_{QPUMP}$ is uncoupled from the power output stage of the power converter (block 168). Then, the start-up operation 104 returns to block 154 to see if this start-up cycle was sufficient to activate the controller and subsequent start-up operation cycles repeated as necessary.

Figure 10:
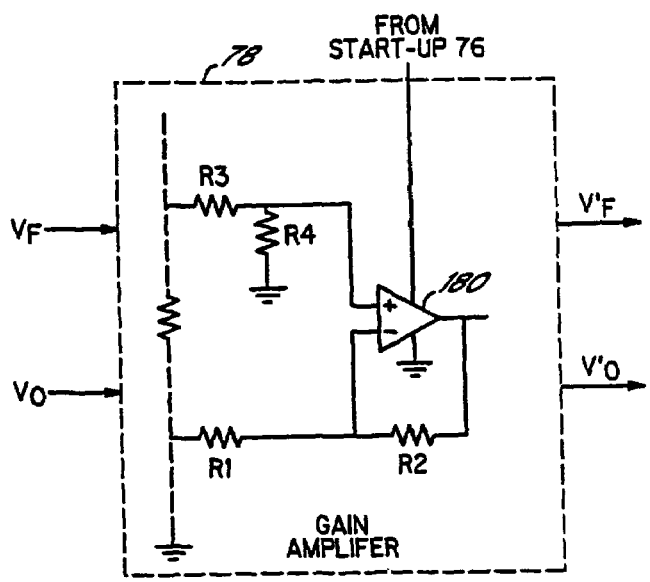
FIG. 10 is an embodiment of a gain amplifier circuit for the boost power converter of FIG. 5 in accordance with the invention.

Referring to FIG. 10, an embodiment of the gain amplifier circuit 78 for the dynamic controller 50b of FIG. 5 is depicted. The gain amplifier circuit 78 accepts as input signals the feedback voltage V$_F$ and the output voltage V$_O$. An operational amplifier 180 is biased by the start-up circuit 76. The positive input of the operational amplifier 180 is the input which is coupled through voltage divider R3/R4. The negative input and output of the operational amplifier are coupled for feedback through resistors R1 and R2. The resistors may be integrated (e.g., poly resistors) and of high impedance (e.g., mega-ohm range) for low power consumption.

Figure 11:
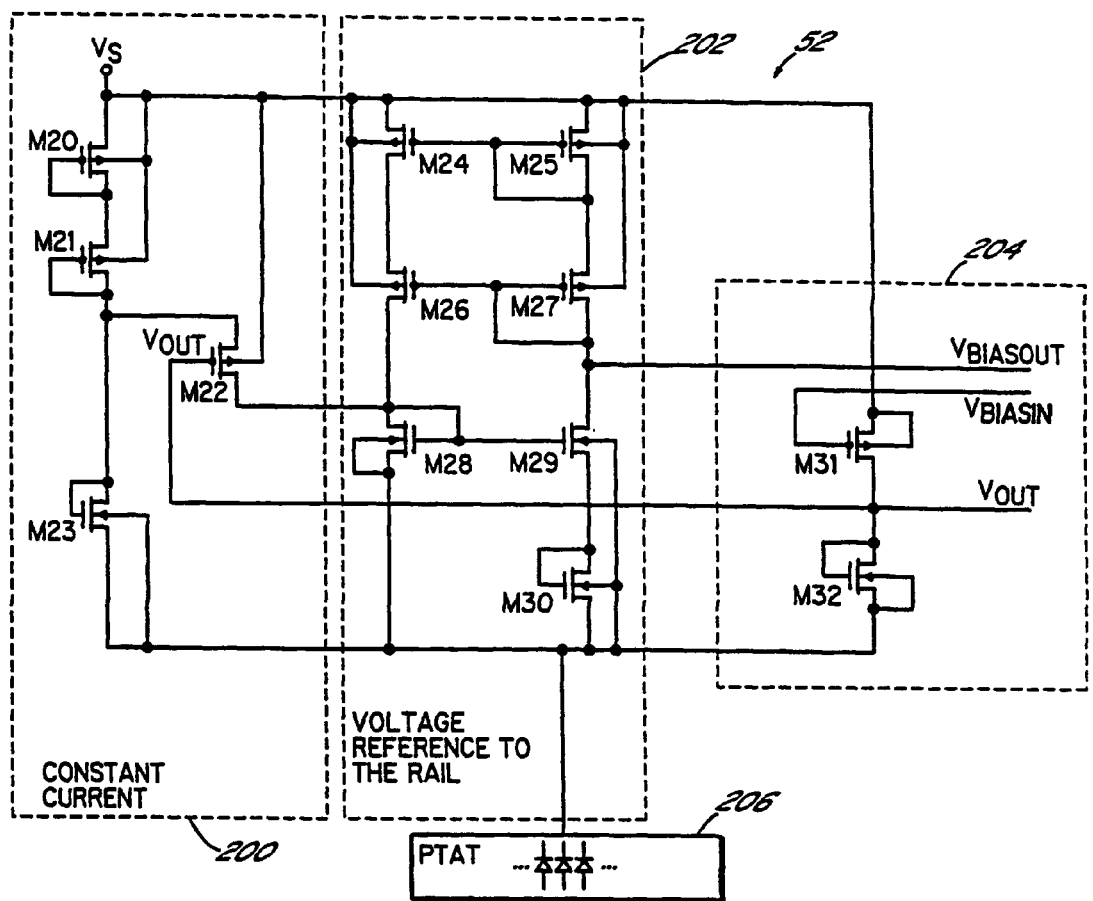
FIG. 11 is an embodiment of a voltage reference circuit for the boost power converter of FIG. 5 in accordance with the invention.

Referring to FIG. 11, one embodiment of a voltage reference circuit 52 is shown for the boost power converter 30b of FIG. 5, capable of sub-one volt input voltage V$_S$ operation in accordance with an aspect of the invention. A constant current circuit 200 powers a voltage reference-to-rail circuit 202, isolating the voltage reference-to-rail circuit 202 from changes in the input voltage V$_S$. An output buffer 204 amplifies an unamplified reference voltage from the voltage reference-to-rail circuit 202. In order to temperature compensate the voltage reference-to-rail circuit 202, a parallel diode array Proportional to the Absolute Temperature (PTAT) circuit 206 biases the circuit 202.

Figure 12:
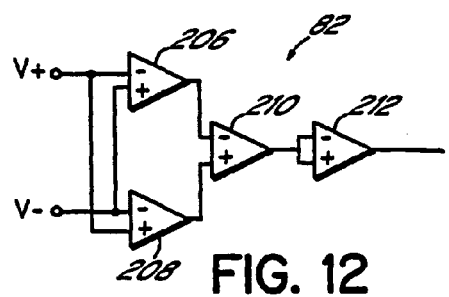
FIG. 12 is top-level block diagram of an embodiment of the comparator for the boost power converter of FIG. 5 in accordance with the invention.
Figure 13:
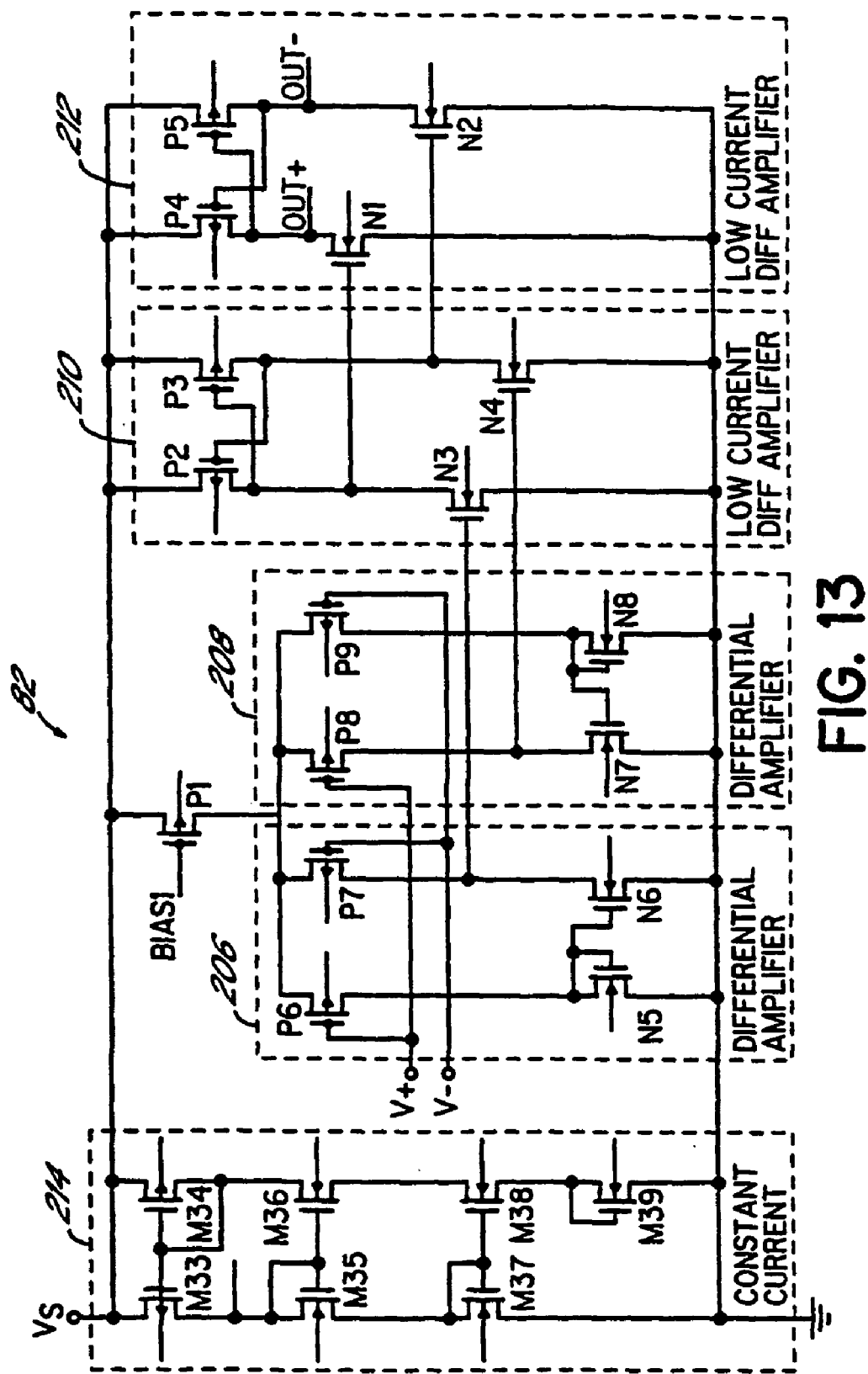
FIG. 13 is an embodiment of a circuit for the comparator of FIG. 12 in accordance with the invention.

Referring to FIGS. 12 and 13, one embodiment of a comparator 82 is depicted for the boost power converter 30b of FIG. 5. Differential amplifiers 206–210 are advantageously used since they are effective in rejecting common-mode signals. For example, common-mode signals may be induced noise on the inputs. Integrated circuit differential amplifiers have relatively low output gain. This has implications in two ways: non-linearity in an input transistor and in providing necessary current gain for the timing circuit 84.

For providing some cancellation of input non-linearity, a three differential amplifier combination is depicted, wherein the first differential amplifier 206 receives a V+ input at its negative input and V− at its positive input. A second differential amplifier 208 receives V− at its negative terminal and V+ at its positive terminal. The output of the first differential amplifier 206 is coupled to a negative terminal of a third differential amplifier 210 and the output of the second differential amplifier 208 is coupled to a positive input of the third differential amplifier 210. A fourth differential amplifier 212 is configured as a voltage follower buffer to increase the current of a comparator switching signal (Out+, Out−) from the third differential amplifier 210.

Figure 14:
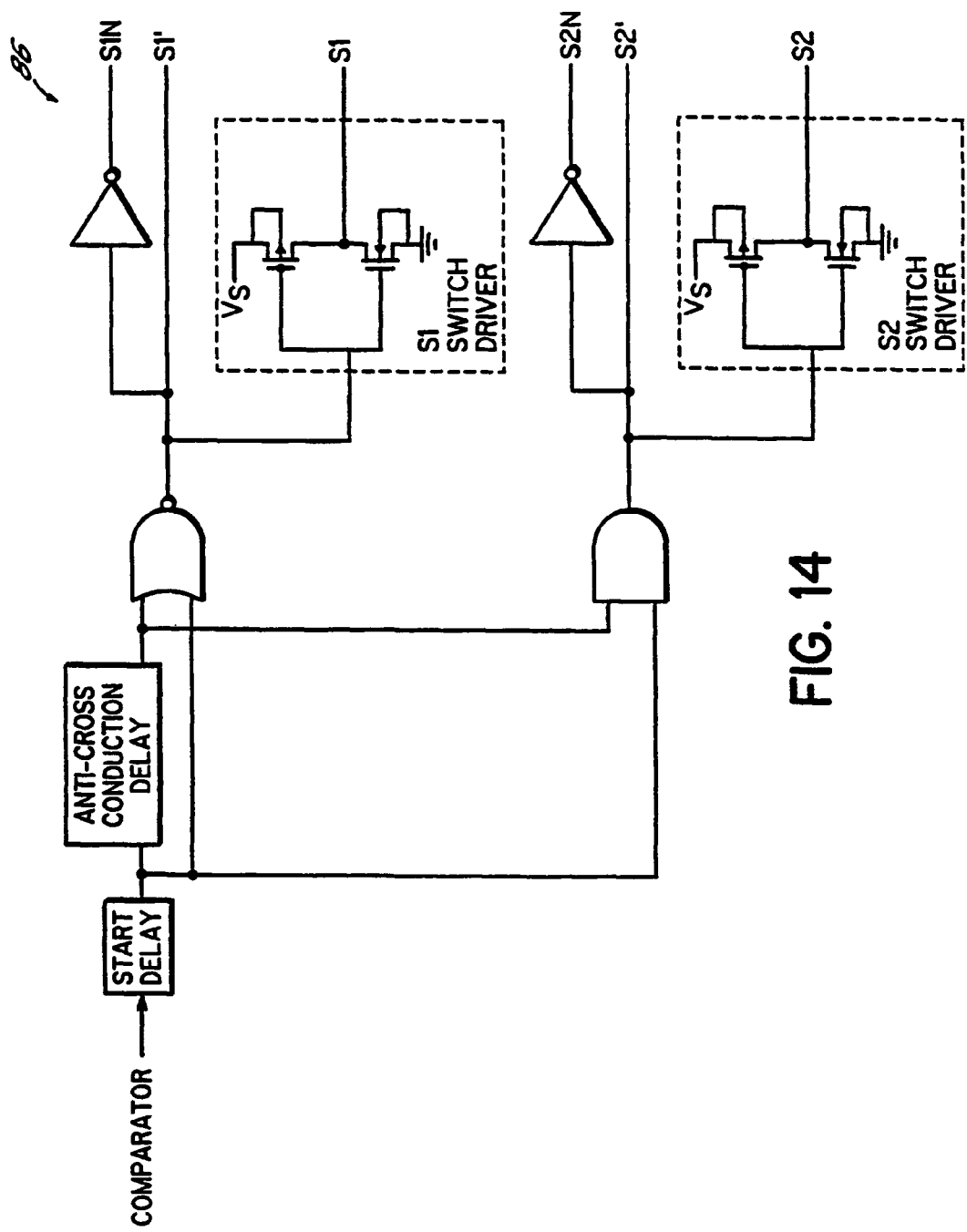
FIG. 14 is an embodiment of a circuit for the timing circuit of FIG. 5 in accordance with the invention.

Referring to FIG. 14, one embodiment of the timing circuit 84 is depicted for the power controller 46A of FIG. 5.

Figure 15:
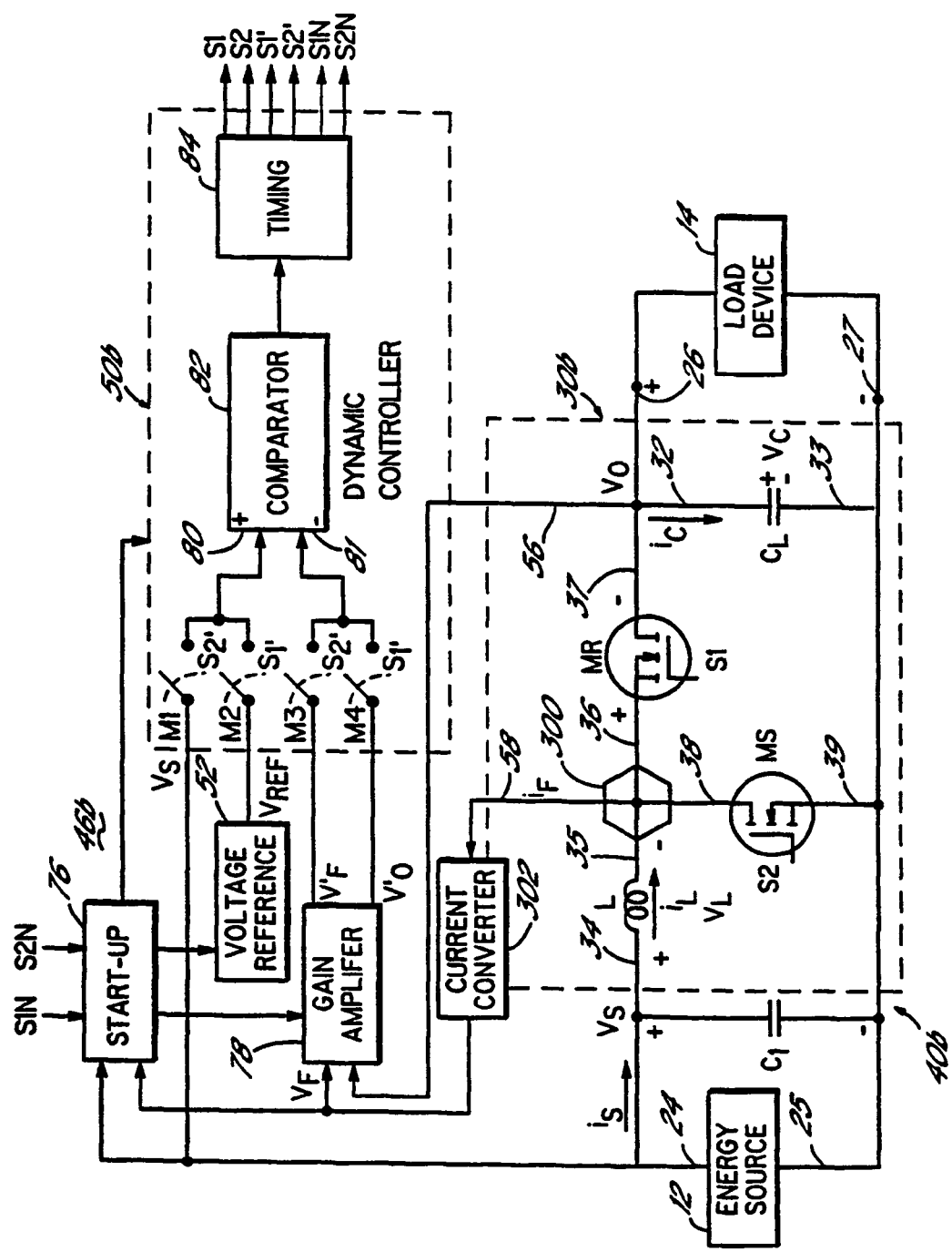
FIG. 15 is an embodiment of a circuit for a current-feedback oscillator-less controller for the boost power converter of FIG. 2B.

Referring to FIG. 15, an embodiment of a circuit for a current-feedback oscillator-less dynamic controller 50b is shown for the boost power output stage 30b of FIG. 2B. Specifically, a feedback current $i_F$ sensed by a current probe 300 at feedback voltage $V_F$ node. The feedback current $i_F$ is related to, or the same as, the inductor current $i_L$. The sensed feedback current $i_F$ is converted into a feedback voltage $V_F$ by a current converter 302 for an input to the gain amplifier 78 as described above.

While the present invention has been illustrated by description of several embodiments and while the illustrative embodiments have been described in considerable detail, it is not the intention of applicants to restrict or in any way limit the scope of the appended claims to such detail. Additional advantages and modifications readily appear to those skilled in the art.

For example, for clarity, the switch MS and rectifying element MR are normally open, closed by a positive ON signal. It would be apparent to those skilled in the art having the benefit of the instant disclosure to use normally closed switches and/or switches closed by a negative ON signal.

As another example, a power converter consistent with the invention may be incorporated in a wide range of products. For example, a power converter 31 taking advantage of the small size and low power consumption (i.e., efficiency) properties described above may advantageously be incorporated into a battery package to enhance battery service life and energy and amplitude on demand. Incorporating the power converter would be accomplished in manner similar to that disclosed in the following co-pending and commonly owned applications all filed on Apr. 2, 1998: U.S. Ser. No. 09/054,192, entitled PRIMARY BATTERY HAVING A BUILT-IN CONTROLLER TO EXTEND BATTERY RUN TIME, naming Vladimir Gartstein and Dragan D. Nebrigic; U.S. Ser. No. 09/054,191, entitled BATTERY HAVING A BUILT-IN CONTROLLER TO EXTEND BATTERY SERVICE RUN TIME naming Vladimir Gartstein and Dragan D. Nebrigic; U.S. Ser. No. 09/054,087, ENTITLED BATTERY HAVING A BUILT-IN CONTROLLER, naming Vladimir Gartstein and Dragan D. Nebrigic; and U.S. Provisional Application Ser. No. 60/080,427, entitled BATTERY HAVING A BUILT-IN CONTROLLER TO EXTEND BATTERY SERVICE RUN TIME, naming Dragan D. Nebrigic and Vladimir Gartstein. All of the aforementioned applications are hereby incorporated by reference in their entirety.

What is claimed is:

1. A power converter with input terminals for coupling to an energy source and output terminals for coupling to a load device, the power converter comprising:

an output stage for selectively coupling the input terminals to the output terminals to deliver energy from an energy source to a load device;

a controller operably coupled to the output stage for dynamically controlling said selective coupling of the input and output terminals;

the output stage further characterized by an inductive element coupled to the input terminals, a capacitive element coupled to the output terminals, a MOSFET synchronous rectifying in element having a channel that conducts in the reverse direction, the rectifying element being closingly responsive to a first state and openly responsive to a second state, and a switch responsive to a control signal from the controller, the rectifying element and the switch being operably coupled with respect to said inductive and capacitive elements for causing the inductive element to be coupled to the capacitive element to discharge energy therefrom into the capacitive element by operably forming a series connected circuit of the power source, the inductive element and the capacitive element during the first state and causing the inductive element to be energized by operably forming a series connected circuit of the power source, the inductive element and the switch during the second state;

the controller being responsive to input signals for selectively and non-oscillatorily generating the control signal to open the switch in said first state and close the switch in said second state, the input signals to the controller including an input voltage across the input terminals, and at least one of an output voltage across the output terminals, a selectable reference voltage and a feedback signal measured with respect to the inductive element.

2. The power converter of claim 1, further characterized by including an amplifier coupled to the output stage and the controller, the amplifier configured to amplify at least one of the feedback voltage and the output voltage.

3. The power converter as in claim 1, characterized in that the controller includes a switch driver operable for amplifying the control signal to the switch.

4. The power converter as in claim 1, characterized in that the rectifying element is further characterized by a Field Effect Transistor.

5. The power converter as in claim 1, characterized in that the switch is further characterized by at least one low threshold, low on resistance MOSFET.

6. The power converter as in claim 1, characterized in that the controller is further characterized by a voltage reference circuit for producing the reference voltage.

7. The power converter as in claim 1, characterized in that the controller includes a comparator for responding to the input signals, the comparator including a first and second comparator input coupled respectively to two of the input signals, the comparator generating a switching signal at a comparator output to define the first and second states.

8. The power converter as in claim 1, further characterized by a capacitive element electrically coupled across the input terminals for input voltage stability.

9. The power converter as in claim 1, further characterized in that the inductive element includes an inductive element current, the controller further comprising a current converter coupled to the inductive element, operable to sense the inductive element current and to convert the inductive element current into the feedback voltage.

10. An integrated circuit including a power converter with input terminals for coupling to an energy source and output terminals for coupling to a load device, the integrated circuit comprising:

an output stage for selectively coupling the input terminals to the output terminals to deliver energy from an energy source to a load device;

a controller operably coupled to the output stage for dynamically controlling said selective coupling of the input and output terminals;

the output stage adapted for coupling an inductive element to the input terminals and the coupling a capacitive element to the output terminals, the output stage further characterized by a MOSFET synchronous rectifying element having a channel that conducts in the reverse direction, the rectifying element being responsive to a control signal, and a switch responsive to a control signal from the controller, the rectifying element and the switch being operably coupled with respect to said inductive and capacitive elements for causing the inductive element to be coupled to the capacitive element to discharge energy therefrom into the capacitive element by operably forming a series connected circuit of the power source, the inductive element and the capacitive element during a first state and causing the inductive element to be charged by operably forming a series connected circuit of the power source, the inductive element and the switch during a second state;

the controller being responsive to input signals for selectively and non-oscillatorily generating the control signal to close the rectifying element during the first state and to open the rectifying element during the second state, and generating the control signal to open the switch during the first state and to close the switch during the second state, the input signals to the controller including an input voltage across the input terminals, and at least one of an output voltage across the output terminals, a selectable reference voltage and a feedback voltage measured across the inductive element.

11. The power converter as in claim 1, wherein said rectifying element comprises sub-one volt MOSFET transistor switches.

12. The power converter as in claim 10, wherein said rectifying element comprises sub-one volt MOSFET transistor switches.

* * * * *

UNITED STATES PATENT AND TRADEMARK OFFICE
CERTIFICATE OF CORRECTION

| | | |
|---|---|---|
| PATENT NO. | : 7,208,928 B2 | Page 1 of 1 |
| APPLICATION NO. | : 10/221424 | |
| DATED | : April 24, 2007 | |
| INVENTOR(S) | : Nebrigic et al. | |

It is certified that error appears in the above-identified patent and that said Letters Patent is hereby corrected as shown below:

In the Issued Patent:

Column 14, line 20, please delete "in".

Signed and Sealed this

Twenty Second Day of April, 2008

JON W. DUDAS
*Director of the United States Patent and Trademark Office*